United States Patent
Schillinger (10) Patent No.: US 9,231,433 B2
(45) Date of Patent: Jan. 5, 2016

(54) APPARATUS AND METHOD FOR CHARGING AN ELECTRICAL ENERGY STORE FROM AN AC VOLTAGE SOURCE

(71) Applicant: Robert Bosch GmbH, Stuttgart (DE)

(72) Inventor: Bertram Schillinger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 14/074,375

(22) Filed: Nov. 7, 2013

(65) Prior Publication Data
US 2014/0132203 A1    May 15, 2014

(30) Foreign Application Priority Data

Nov. 8, 2012    (DE) .................. 10 2012 220 376

(51) Int. Cl.
*H02J 7/00* (2006.01)
*H02J 7/04* (2006.01)
*H02J 7/02* (2006.01)

(52) U.S. Cl.
CPC .. *H02J 7/04* (2013.01); *H02J 7/022* (2013.01)

(58) Field of Classification Search
None
See application file for complete search history.

(56) References Cited

U.S. PATENT DOCUMENTS

| | | | | |
|---|---|---|---|---|
| 4,202,031 A * | 5/1980 | Hesler et al. | | 363/97 |
| 4,488,213 A * | 12/1984 | Buikema | | 363/58 |
| 4,583,035 A * | 4/1986 | Sloan | | 320/146 |
| 5,109,185 A * | 4/1992 | Ball | | 323/207 |
| 5,563,777 A * | 10/1996 | Miki et al. | | 363/37 |
| 5,642,275 A * | 6/1997 | Peng et al. | | 363/137 |
| 6,388,416 B1 * | 5/2002 | Nakatani et al. | | 318/700 |
| 7,135,836 B2 * | 11/2006 | Kutkut et al. | | 320/116 |
| 7,898,229 B2 * | 3/2011 | Babcock et al. | | 323/225 |
| 8,395,280 B2 * | 3/2013 | Graovac et al. | | 307/82 |
| 8,503,205 B2 * | 8/2013 | Carletti et al. | | 363/78 |
| 8,634,217 B2 * | 1/2014 | Walters | | 363/81 |
| 8,638,074 B2 * | 1/2014 | Babcock et al. | | 323/225 |
| 2010/0084918 A1 * | 4/2010 | Fells et al. | | 307/32 |
| 2011/0216563 A1 * | 9/2011 | Ribarich | | 363/124 |
| 2011/0254461 A1 * | 10/2011 | Summerland et al. | | 315/291 |
| 2013/0257355 A1 * | 10/2013 | Feuerstack et al. | | 320/107 |
| 2014/0016370 A1 * | 1/2014 | Chandrasekaran | | 363/21.12 |
| 2014/0035530 A1 * | 2/2014 | Shao | | 320/109 |

FOREIGN PATENT DOCUMENTS

GB    2291287    1/1996

* cited by examiner

*Primary Examiner* — Leigh Garbowski
(74) *Attorney, Agent, or Firm* — Michael Best & Friedrich LLP (57) ABSTRACT

Apparatus for charging an electrical energy store from an AC voltage source. The apparatus includes a rectifier device with a capacitor interconnected in parallel with the rectifier device A current controller device is interconnected with the rectifier device. A converter device is interconnected with the current controller device. The converter device includes at least one first half-bridge having two switches connected in series, An inductor is interconnected with a connection point of the switches of the first half-bridge Depending on the voltage of the AC voltage source and a current through the inductor a switch of the current controller device and one of the switches of the first half-bridge of the converter device are switchable by means of a controller in such a manner that a current for charging the electrical energy store drawn from the AC voltage source and a voltage of the AC voltage source are substantially in phase.

15 Claims, 6 Drawing Sheets

APPARATUS AND METHOD FOR CHARGING AN ELECTRICAL ENERGY STORE FROM AN AC VOLTAGE SOURCE

BACKGROUND OF THE INVENTION

The invention relates to an apparatus for charging an electrical energy store from an AC voltage source. The invention also relates to a method for charging an electrical energy store from an AC voltage source.

DE 195 235 76 A1 describes an AC voltage-DC voltage power supply unit and a method for converting an AC voltage into a DC voltage in high-voltage systems. The AC voltage-DC voltage power supply unit described in that document comprises a semiconductor switch which has a lower breakdown voltage on a low-voltage side of the flyback converter than a semiconductor switch on a high-voltage side. The lower breakdown voltage can be achieved by means of a shunt regulator which regulates a clamping voltage on the low-voltage switch side.

SUMMARY OF THE INVENTION

According to a first aspect, the invention provides an apparatus for charging an electrical energy store from an AC voltage source, having:
 a rectifier device with a capacitor interconnected in parallel with the rectifier device;
 a current controller device interconnected with the rectifier device;
 a converter device interconnected with the current controller device, said converter device having at least one first half-bridge comprising two switches connected in series; and
 an inductor, wherein the inductor is interconnected with a connection point of the switches of the first half-bridge;
 wherein, depending on the voltage of the AC voltage source and a current through the inductor, a switch of the current controller device and one of the switches of the first half-bridge of the converter device are switchable by means of a controller in such a manner that a current for charging the electrical energy store drawn from the AC voltage source and a voltage of the AC voltage source are substantially in phase.

According to a second aspect, the invention provides a method which comprises the following steps:
 rectifying an AC input voltage;
 stepping down the rectified AC input voltage if a voltage level of the AC input voltage is higher than a voltage level of the electrical energy store; and
 generating a back-emf with respect to the rectified voltage in such a way that a voltage of the AC voltage source and a current which is drawn from the AC voltage source for charging the electrical energy store are substantially in phase.

One preferred embodiment is characterized in that depending on a charging current and the voltage of the AC voltage source, a duty ratio of the second switch of the first half-bridge and of the switch of the current controller device is adjustable by means of the controller. As a result, by means of the duty ratio of the second switch, a sinusoidal charging current and an ohmic behavior of the charging current for the electrical energy store can advantageously be set.

One preferred embodiment of the apparatus according to the invention is characterized in that the switch of the current controller device is permanently closed, wherein only the second switch of the first half-bridge of the converter device is cyclically switched. This makes it possible to generate the required back-emf for driving the charging current when a voltage level of the AC voltage source is lower than a voltage level of the battery voltage.

One preferred embodiment of the apparatus according to the invention is characterized in that in each case one winding of a three-phase electric motor is interconnected with in each case one connection point of two switches of a half-bridge of the converter device. This advantageously causes the use of a winding inductance of motor windings of an electric motor which is already present. As a result, an external inductor can advantageously be designed to be smaller or, in certain circumstances, can even be dispensed with altogether.

One preferred embodiment of the apparatus according to the invention is characterized in that second switches of a second and a third half-bridge of the converter device are switchable in a synchronized manner. This advantageously results in a smaller load on the switches of the converter device, which is reflected in an increased operating time. Advantageously, the switches of the converter device can also be clocked at a higher frequency as a result.

One preferred embodiment of the apparatus according to the invention is characterized in that the second switches of the second and third half-bridges of the converter device are switchable in an interleaved manner. Owing to the increased switching frequency, this advantageously causes a reduction in ripple of the charging current. The higher clock frequency of the switches results from a lower power loss owing to a lower current load on the individual switches. Therefore, as a result, total losses (comprising on-state losses and switching losses) are advantageously reduced.

What is considered to be particularly advantageous in the case of the invention is that a converter which is already present can be used to charge the electrical energy store in a charging mode of the electric vehicle. As a result, a conventional intermediate circuit capacitor can advantageously be omitted. In addition, the converter is also used to implement an apparatus to improve harmonics, with the result that the conventional correction device can be omitted. In this way, a charging apparatus according to the invention can advantageously be configured to be substantially simpler and less expensive. By means of the galvanic isolation by means of the transformer device, a safety aspect for users is advantageously also increased.

BRIEF DESCRIPTION OF THE DRAWINGS

Further features and advantages of the present invention are explained below on the basis of embodiments with reference to figures. The figures are primarily intended to elucidate the principles essential to the invention, and should not necessarily be understood as faithfully detailed circuit diagrams. In the figures, identical reference signs designate identical or functionally identical elements.

In the figures.

DETAILED DESCRIPTION

Figure 1:
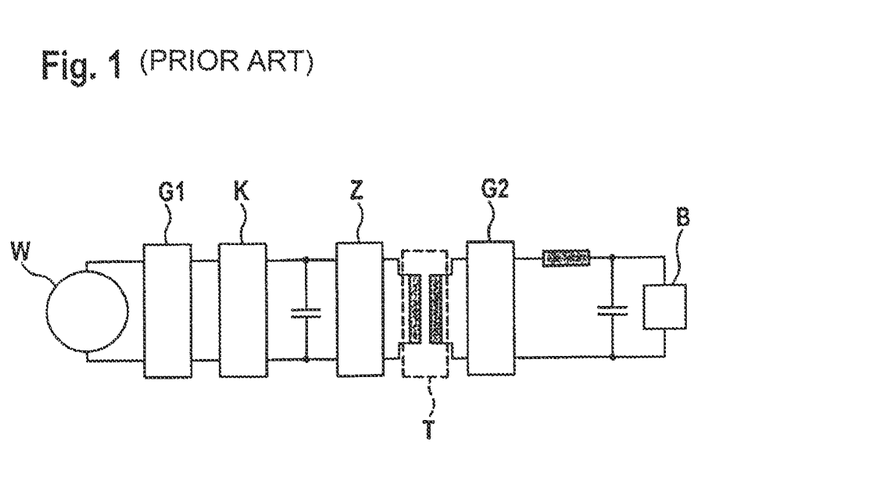
FIG. 1 shows a basic block circuit diagram of a charging apparatus according to the prior art.

FIG. 1 shows a basic block circuit diagram of a conventional apparatus for charging an electrical energy store B (for example, a high-voltage battery of an electric vehicle) from an AC voltage source W. In this case, a first rectifier device G1 is electrically connected to the AC voltage source W. The AC voltage is converted into a DC voltage by means of the first rectifier device G1 and an intermediate circuit capacitor. An electrical chopper device Z chops the rectified AC voltage in order to transmit said voltage via a transformer device T with a defined turns ratio. Downstream of the transformer device T, a second rectifier device G2 rectifies the chopped voltage again. A low-pass filter which is connected downstream and has an inductor and a capacitor filters the remaining harmonics from the rectified voltage.

In order to comply with standardized requirements regarding harmonic emissions in the public AC voltage power supply system, a correction device K is connected between the first rectifier device G1 and the electrical chopper device Z, said correction device substantially ensuring that the current drawn from the AC voltage source W is in phase with the AC voltage from the AC voltage source W.

FIG. 2 shows a basic block circuit diagram of a first embodiment of the apparatus 100 according to the invention for charging an electrical energy store. The apparatus 100 has a rectifier device G which is electrically connected to an AC voltage source W. A buffer capacitor connected in parallel with the AC voltage source W and with the rectifier device G has the task of preventing electrical voltage dips in the case of the switching, explained below, of a switch STS of a step-down converter or current controller device TS. The current controller device TS is interconnected with the rectifier device G and comprises a switch STS and a diode operated in the reverse direction. An inductor L is interconnected between the current controller device TS and a connection point of two switches S1, S2 of a first half-bridge H1 of a converter device U (for example a B6 inverter).

Figure 2A:
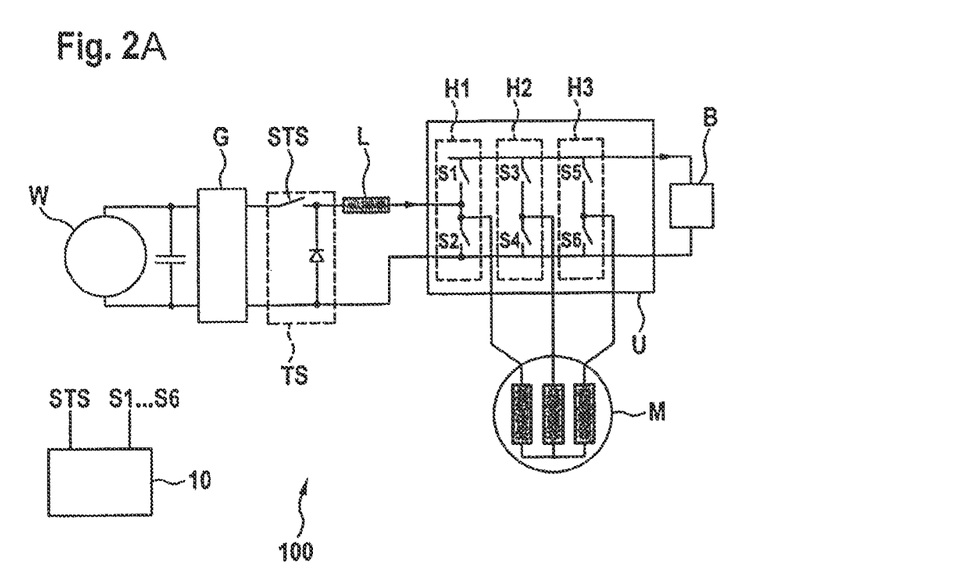
FIG. 2A shows a basic block circuit diagram of a first embodiment of an apparatus according to the invention for charging an electrical energy store.

The converter device U also has a further half-bridge H2 with a pair of switches S3, S4 and a further half-bridge H3 with a pair of switches S5, S6. In each case one winding inductance of an electric motor M is interconnected at the connection points of the switches S1 ... S6 of the aforesaid half-bridges H1, H2, H3, said electric motor being actuated in a driving mode of the electric vehicle (not illustrated) by means of the converter device U. The functionality of the actuation of the electric motor M by means of the converter device U is known per se and is therefore not described in any more detail here. An electrical energy store B for storing electrical energy is connected to an output of the converter device U. The AC voltage $U_{AC}$ of the AC voltage source W is firstly rectified by means of the rectifier device G.

On the basis of—detected by sensors (not illustrated)—values and/or profiles of the voltage $U_{AC}$ of the AC voltage source, a current through the inductor L and an electrical voltage of the electrical energy store B, different switching scenarios are provided. In this case, a controller 10 is used to control said switches STS, S1 ... S6, which controller actuates the switches S1 ... S6 of the converter device U and the switch STS of the current controller device TS on the basis of said electrical variables.

In the event that the voltage $U_{AC}$ of the AC voltage source W is larger than the electrical voltage of the electrical energy store B, the current controller device TS takes on the function of stepping down the rectified voltage (step-down converter). For this purpose, the switch STS of the current controller device TS is clocked at a suitable clock frequency, for example at approximately 10 kHz. The buffer capacitor buffers the AC input voltage. The converter device U connected downstream functionally implements a step-up converter topology, wherein, by means of a clocked activation of the second switch S2 of the first half-bridge H1 and of the switch STS of the current controller device TS, a back-emf is built up downstream of the inductor L, said back-emf driving a charging current for the electrical energy store B via a freewheeling diode (not illustrated) connected in parallel with the switch S1.

Even in the event that the power supply system voltage $U_{AC}$ is smaller than the voltage of the electrical energy store B, the converter device U acts as a step-up converter. In this case, however, the switch STS of the current controller device TS remains permanently closed and only the second switch S2 of the first half-bridge H1 is clocked.

As a result, therefore, it is possible for the electrical energy store B to be charged in a wide electrical voltage range of the electrical energy store B and of the AC voltage power supply system.

A plurality of graphs within FIG. 2A show temporal profiles of electrical variables within the apparatus 100, wherein the positions, within the apparatus 100, at which the respective variable occurs are indicated with arrows.

Figure 2B:
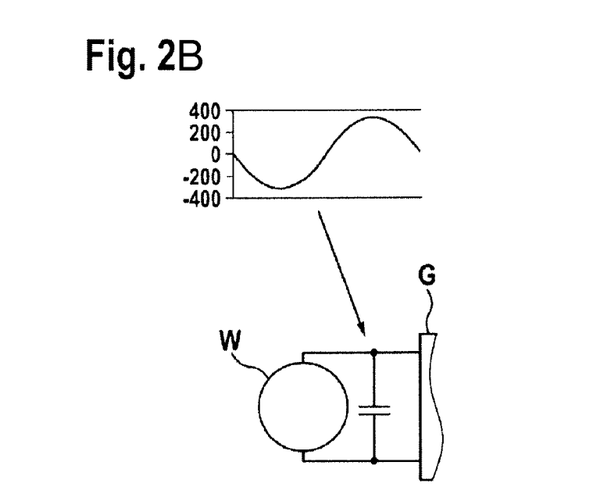
FIGS. 2B . . . 2E show basic temporal profiles of electrical variables within the apparatus from FIG. 2A.

FIG. 2B shows a temporal profile of the AC voltage $U_{AC}$ of the AC voltage source W.

Figure 2C:
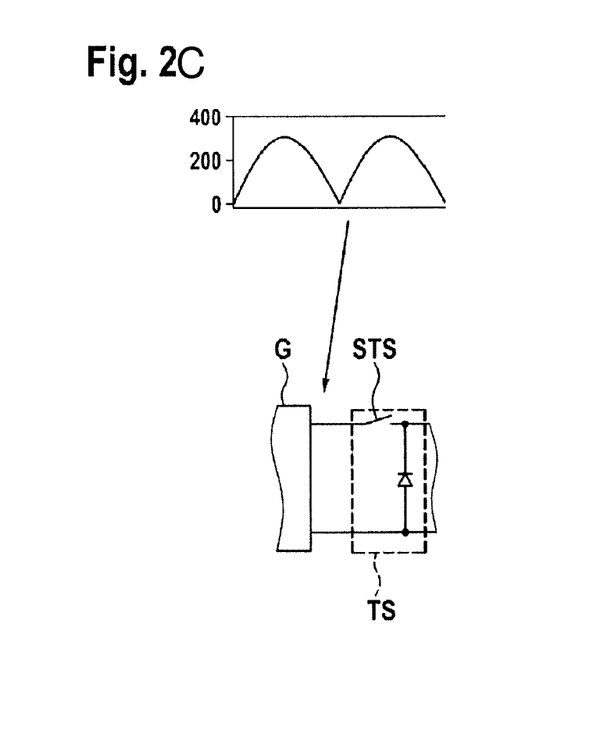

FIG. 2C shows a temporal profile of the rectified AC voltage downstream of the rectifier device G.

Figure 2D:
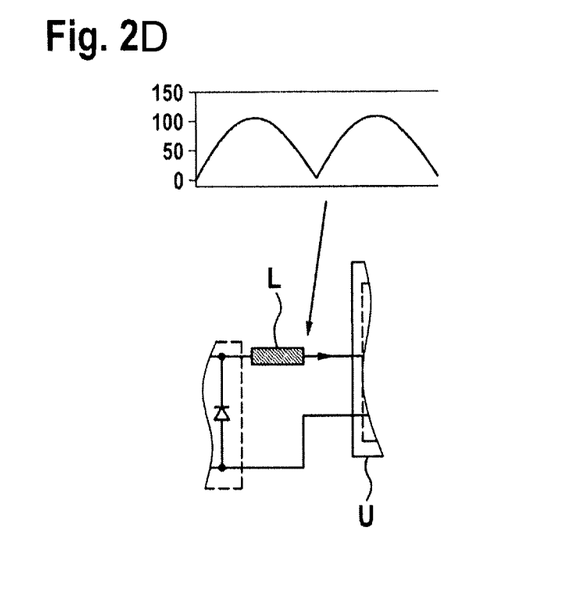

FIG. 2D shows the profile of a back-emf of the converter device U downstream of the inductor L.

Figure 2E:
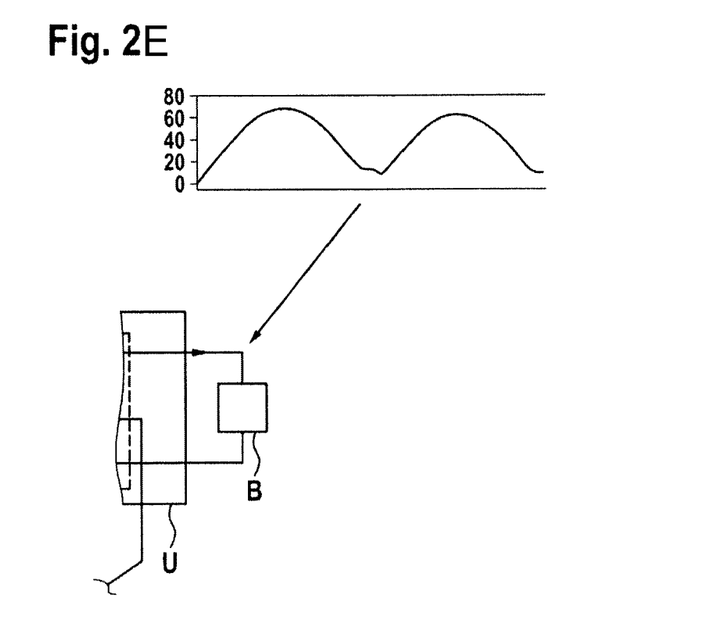

FIG. 2E shows a profile of the charging current (battery charging current) of the electrical energy store B.

A possible modification of the apparatus 100 according to the invention provides that the winding inductances of the electric motor M are used as the inductor L. In this case, the external inductor L can be made smaller or, in certain circumstances, can even be dispensed with altogether. The inductance of the motor windings is therefore used in addition to the inductor L in this case.

In this case, the switch STS of the current controller device TS and the second switch S4 of the second half-bridge H2 must be switched in a synchronous manner. In order to ensure the utilization of the winding inductances, the two switches S1, S2 of the first half-bridge H1 must remain permanently open in this case.

An alternating switching of the switches S3, S4 of the second half-bridge H2 is also possible, wherein the charging current for the electrical energy store B flows through two winding inductances in this case and the input inductance is increased in this way.

Alternatively, the second switch S2 of the second half-bridge H2 and the second switch S6 of the third half-bridge H3 can also be switched in an interleaved manner, as a result of which a ripple of the charging current can advantageously be reduced.

Finally, it is also possible for the switches of the two half-bridges H2 and H3 to be clocked alternately or synchronously with respect to one another. In this way, the converter device U can advantageously be clocked at an even higher frequency owing to uniformly distributed switching losses in the switches S4 ... S6, which advantageously also leads to a reduction in the ripple of the charging current owing to the fact that the charging current is divided between the two half-bridges H2, H3.

Figure 3:
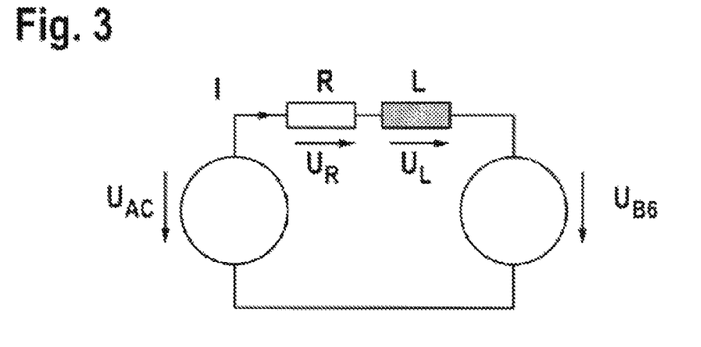
FIG. 3 shows an electrical equivalent circuit diagram of the apparatus according to the invention.

FIG. 3 illustrates a basic electrical equivalent circuit diagram with electrical variables, in which the galvanic isolation by means of the transformer device T is not taken into account. It can be seen that the individual electrical voltages: $U_{AC}$ (voltage of the AC voltage source W), $U_R$ (voltage drop owing to ohmic losses), $U_L$ (voltage drop across the inductor L) and $U_{B6}$ (back-emf of the converter device U) form a closed voltage mesh and sum to zero.

It can therefore be seen, in principle, that in the event that $U_{AC} > U_{B6}$, a current I flows from the AC voltage source W in the direction of the converter device U and hence into the electrical energy store B. The inductor L is therefore used as a type of decoupler between the electrical voltage $U_{AC}$ of the AC voltage source W and the back-emf $U_{B6}$ of the converter device U.

Figure 4:
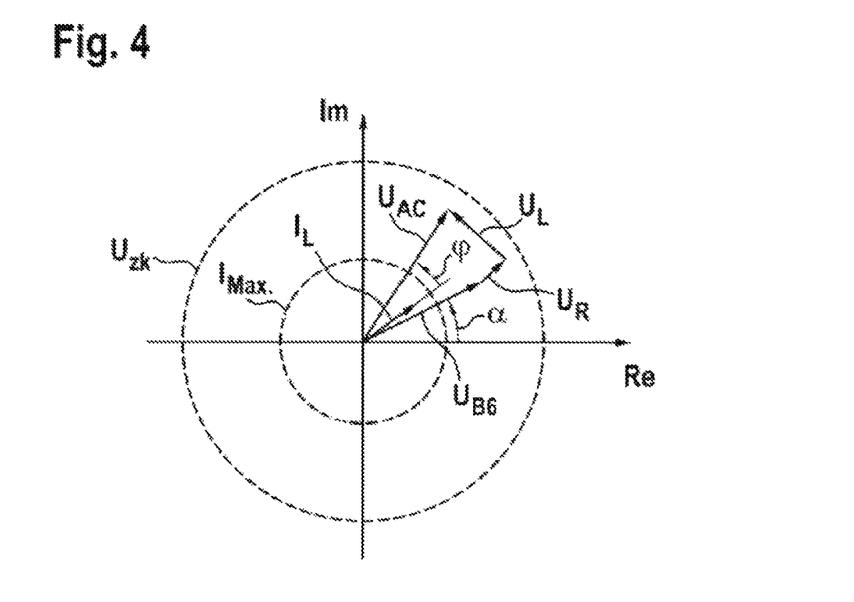
FIG. 4 shows a phasor diagram with voltages and currents within the apparatus according to the invention.

FIG. 4 illustrates a phasor diagram of the equivalent circuit diagram from FIG. 3. It can be seen that, by means of the back-emf $U_{B6}$ of the converter device U, the current through the converter device U and hence the charging current of the electrical energy store B can be controlled in such a way that it is substantially in phase with the AC input voltage $U_{AC}$. In this way, the converter U is not only used for controlling a level of the charging current but also takes on the function of the conventional correction device K.

It can be seen from FIG. 4 that, by changing a phase angle α of the back-emf $U_{B6}$, a phase angle φ between the charging current I and the voltage $U_{AC}$ of the AC voltage source is substantially zero. A maximum value of the charging current is indicated by $I_{Max}$.

Figure 5A:
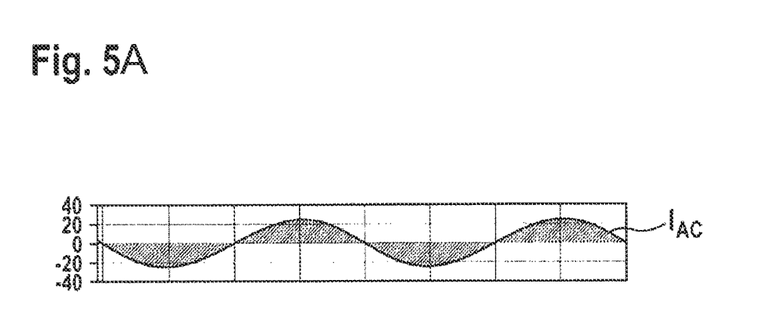
FIGS. 5A ... 5C show a basic timing diagram with signal profiles of currents and voltages within the apparatus according to the invention.
Figure 5B:
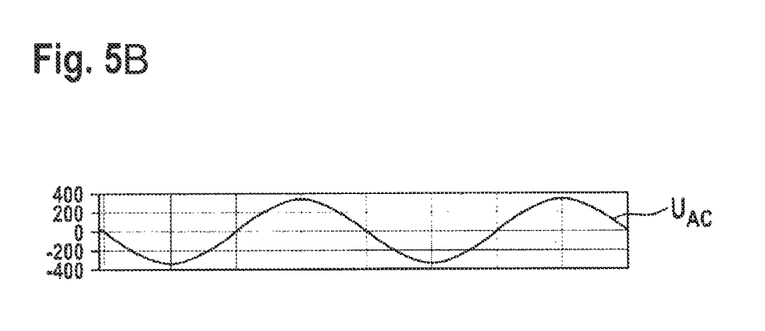
Figure 5C:
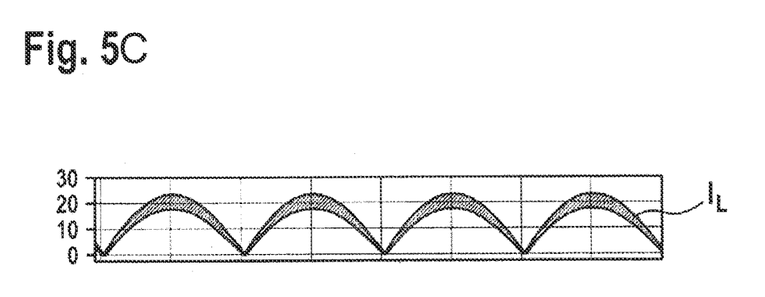

FIGS. 5A . . . 5C show a plurality of temporal profiles of electrical variables of the apparatus according to the invention.

FIG. 5A shows a temporal profile of a current $I_{AC}$ which is drawn from the AC voltage source W for charging the electrical energy store B.

FIG. 5B shows a temporal profile of the AC voltage $U_{AC}$ of the AC voltage source W.

FIG. 5C shows a temporal profile of the charging current $I_L$ through the inductor L.

It can therefore be seen that the current $I_L$ through the inductor L, which corresponds to the charging current I of the battery, is substantially in phase with the AC voltage $U_{AC}$ of the AC voltage source W and with the current $I_{AC}$ which is drawn from the AC voltage source W during a charging process, which advantageously means a low disturbance of the AC voltage power supply system by harmonics.

Figure 6:
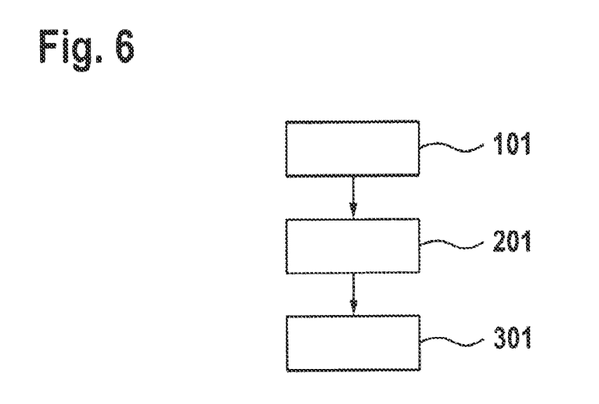
FIG. 6 shows a basic sequence diagram of one embodiment of the method according to the invention.

FIG. 6 shows a basic sequence diagram of one embodiment of the method according to the invention.

In a step 101, the AC input voltage is rectified.

In an optional step 201, the rectified AC input voltage is stepped down only in the event that a voltage level of an AC voltage source is higher than the voltage of the electrical energy store (B).

Finally, in a step 301, a back-emf with respect to the rectified voltage is generated such that a voltage ($U_{AC}$) of the AC voltage source (W) and a current which is drawn from the AC voltage source (W) for charging the electrical energy store (B) are substantially in phase.

In summary, embodiments of the present invention provide an apparatus and a method, in the case of which it is advantageously possible to use a converter device which is already present in a charging mode for charging a battery. In this way, a functionality of an apparatus for improving harmonics is moved to the converter device, with the result that in total a less expensive implementation of the charging apparatus is enabled. Advantageously, no galvanic isolation by means of a transformer device is necessary for implementing the the battery charging system. By means of the converter device, a charging current for the battery can be controlled. In addition, by means of the converter device, the PFC (power factor correction) functionality can be implemented without additional components. Although the present invention has been described on the basis of preferred embodiments, it is not restricted thereto. A person skilled in the art will therefore be able to amend the described features of the invention or combine them with one another without deviating from the essence of the invention.

The invention claimed is:

1. An apparatus for charging an electrical energy store from an AC voltage source, the apparatus comprising:
   a rectifier device with a capacitor interconnected in parallel with the rectifier device;
   a current controller device having a switch, the current controller device interconnected with the rectifier device;
   a converter device interconnected with the current controller device, the converter device having at least one first half-bridge comprising two switches connected in series;
   an inductor interconnected with a connection point between the two switches of the first half-bridge and with the current controller; and
   a three-phase electric motor including a first winding interconnected at the connection point between the two switches of the at least one first half-bridge of the converter device,
   wherein, depending on the voltage of the AC voltage source and a current through the inductor, the switch of the current controller device and one of the switches of the first half-bridge of the converter device are switchable by a controller so that a charging current for charging the electrical energy store drawn from the AC voltage source and a voltage of the AC voltage source are substantially in phase.

2. The apparatus according to claim 1, wherein depending on the charging current and the voltage of the AC voltage source, a duty ratio of the second switch of the first half-bridge and of the switch of the current controller device is adjustable by the controller.

3. The apparatus according to claim 1, wherein the switch of the current controller device is permanently closed, wherein only the second switch of the first half-bridge of the converter device is cyclically switched.

4. The apparatus according to claim 1, wherein the three-phase electric motor includes a second winding interconnected with a connection point between two switches of a second half-bridge of the converter device and a third winding interconnected with a connection point between two switches of a third half-bridge of the converter device.

5. The apparatus according to claim 4, wherein the second switches of the second and the third half-bridge of the converter device are switchable in a synchronized manner.

6. The apparatus according to claim 4, wherein the second switches of the second and the third half-bridges of the converter device are switchable in an interleaved manner.

7. The apparatus according to claim 1, including omitting an intermediate circuit capacitor from the apparatus.

8. The apparatus according to claim 1, the apparatus being free from a transformer device providing galvanic isolation.

9. A method for charging an electrical energy store from an AC voltage source with an apparatus, comprising the steps of:

rectifying an AC input voltage with a rectifier device of the apparatus;

stepping down the rectified AC input voltage when a voltage level of the AC input voltage is higher than a voltage level of the electrical energy store using a step down converter of the apparatus; and generating a back-emf with respect to the rectified voltage with a converter device of the apparatus, the converter device including at least one half-bridge so that a voltage of the AC voltage source and a current which is drawn from the AC voltage source are provided to the electrical energy store substantially in phase for charging the electrical energy store, wherein the apparatus is free from an intermediate circuit capacitor.

10. The method according to claim 9, including providing an inductor between the step down converter and the converter device, the converter device including a plurality of half-bridges that each have first and second switches in series.

11. The method according to claim 10, including switching the second switches of the half-bridges in a synchronized manner.

12. The method according to claim 10, including switching the second switches of the half-bridges in an interleaved manner.

13. The method according to claim 9, including providing an inductor between the step down converter and the converter device.

14. The method according to claim 9, wherein the apparatus is free from a transformer device providing galvanic isolation.

15. A non-transitory computer-readable medium including program code for executing on an electronic controller to:

rectify an AC input voltage with a rectifier device of an apparatus;

stepping down the rectified AC input voltage when a voltage level of the AC input voltage is higher than a voltage level of the electrical energy store using a step down converter of the apparatus; and generating a back-emf with respect to the rectified voltage with a converter device of the apparatus including at least one half-bridge so that a voltage of the AC voltage source and a current which are drawn from the AC voltage source are provided to the electrical energy store substantially in phase for charging the electrical energy store, wherein the apparatus is free from an intermediate circuit capacitor.

* * * * *